United States Patent [19]
Armistead

[11] 4,182,538
[45] Jan. 8, 1980

[54] STORAGE MODULE FOR TAPES

[76] Inventor: Hubert P. Armistead, 1204 Wilkes Blvd., Columbia, Mo. 65201

[21] Appl. No.: 888,295

[22] Filed: Mar. 20, 1978

[51] Int. Cl.² ............................................. A47B 81/06
[52] U.S. Cl. ...................................... 312/12; 312/240; 312/246; 211/41; 206/387
[58] Field of Search .................. 312/8, 9, 10, 12, 111, 312/240, 246; 211/40, 41; 206/387

[56] References Cited

U.S. PATENT DOCUMENTS

| | | | |
|---|---|---|---|
| 1,429,076 | 9/1922 | Helsley | 312/12 |
| 2,364,409 | 12/1944 | Weiskopf | 312/240 |
| 2,559,203 | 7/1951 | Weiskopf | 312/107 |
| 2,742,161 | 4/1956 | Nuttall | 312/12 |
| 3,338,421 | 8/1967 | Lyman | 312/10 |
| 3,638,800 | 2/1972 | Frederick et al. | 312/9 |
| 3,677,396 | 7/1972 | Staar | 312/246 |
| 3,723,823 | 3/1973 | Lit et al. | 211/41 |
| 3,878,438 | 4/1975 | Weisman | 211/41 |
| 3,898,536 | 8/1975 | Wyshak et al. | 211/41 |
| 3,909,088 | 9/1975 | Dennehey et al. | 312/12 |
| 3,938,871 | 2/1976 | Bartholomew | 312/240 |

Primary Examiner—Victor N. Sakran
Attorney, Agent, or Firm—Fishburn, Gold & Litman

[57] ABSTRACT

A storage module for receiving recording tape containers includes a bottom wall having a plurality of elongated, parallel, channel-like trays slidably engaged therein. A plurality of partition-forming insert members are snugly engaged within the trays and divide the same longitudinally into separate compartments having internal dimensions commensurate with the external dimensions of selected containers for snugly receiving the containers therein.

8 Claims, 9 Drawing Figures

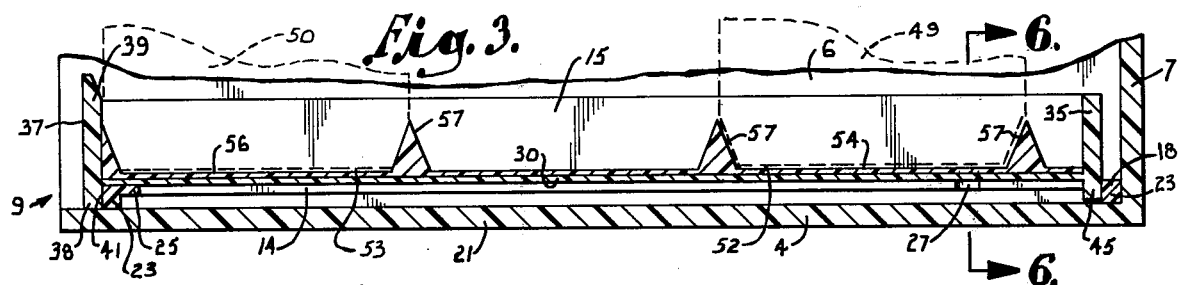
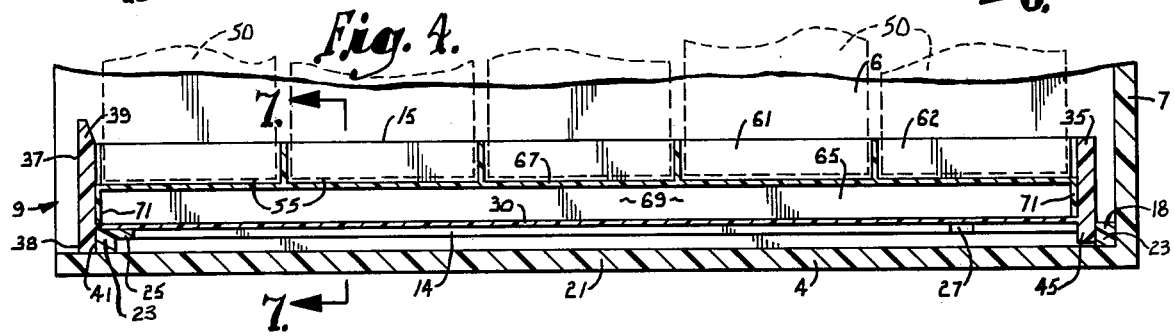
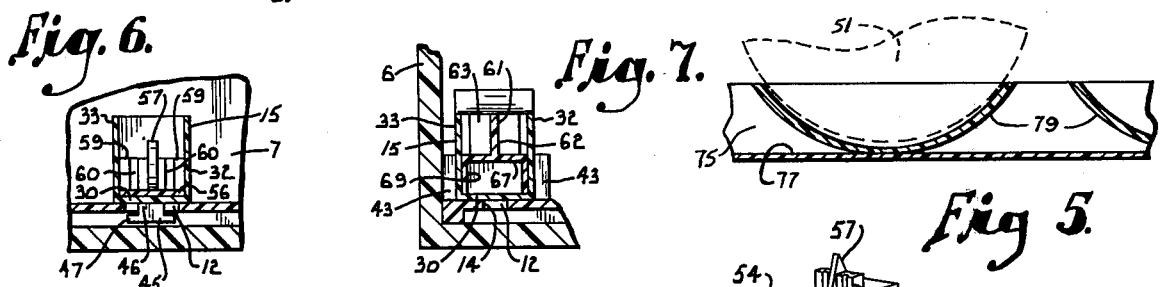
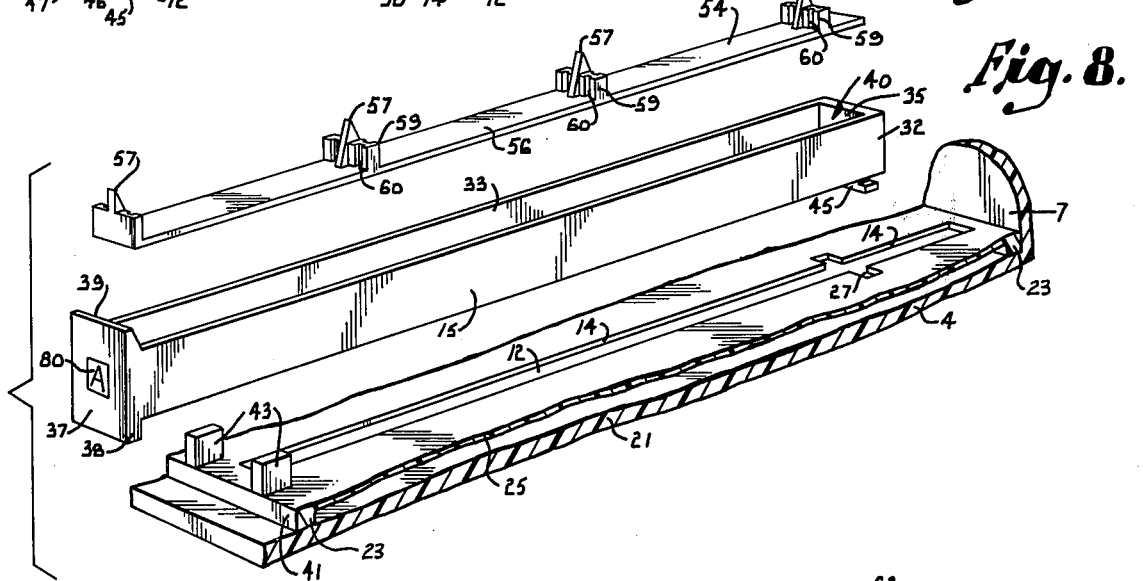
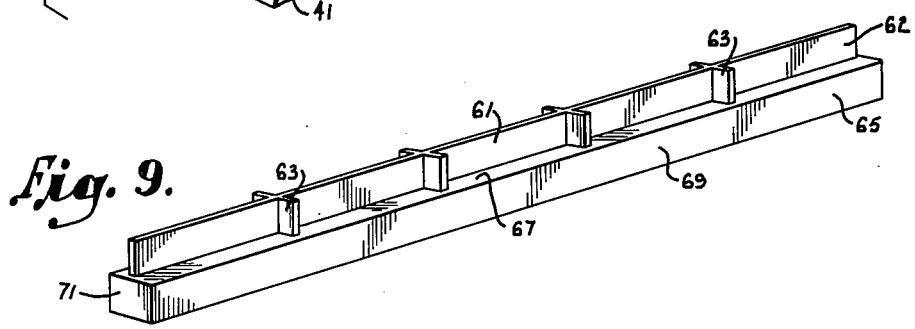

STORAGE MODULE FOR TAPES

This invention relates to storage boxes or cabinets and particularly to such facilities for storing recording tape or film containers such as cartridges and cassettes.

Various types of storage devices for retaining magnetic tape containers are known in the art but generally are adapted to receive only a single type of tape container; that is, such storage devices are typically designed to fit, for example, only a tape cassette or, alternately, a tape cartridge, but not both. Thus, a manufacturer of tape storage boxes or cabinets must heretofore have produced differently sized storage boxes for cassettes and cartridges to effectively meet the growing market in such home entertainment items. Also, the consumer or retailer of both tape cartidges and cassettes, if he wishes to orderly store his items, must purchase separate cabinets adapted to receive separate types of tape containers.

The present invention seeks to overcome the above deficiencies and, in accomplishing this, provides a storage module for tape containers which has removable partitioning members which adapt storage trays for receiving variously sized tape containers such as cartridges, cassettes, and reels.

In view of the above, the principle objects of the present invention are: to provide an improved storage module for storing tape containers in an orderly manner; to provide such a storage module which retains tape containers in a convenient manner for easy selection of a tape for use; to provide such a storage module whereby tapes are held in a compact relationship and occupy a minimum space for storage; to provide such a storage module which is adapted for accomodation of differently sized and shaped tape containers; and to provide such a storage module which is relatively inexpensive, highly reliable in use, and well adapted for its intended purpose.

Other objects and advantages of this invention will become apparent from the following description taken in connection with the accompanying drawings wherein are set forth, by way of illustration and example, certain embodiments of this invention.

FIG. 3 is a cross-sectional view taken along lines 3—3, FIG. 2 showing a first form of tray insert member.

FIG. 4 is a cross-sectional view similar to FIG. 3 and taken along lines 4—4, FIG. 2, showing a second form of tray insert member.

FIG. 5 is a fragmentary cross-sectional view similar to FIG. 3 and showing a third form of tray insert member.

FIG. 6 is a cross-sectional view taken along lines 5—5, FIG. 3 and illustrating means slidably retaining the tray in connection with the storage module.

FIG. 7 is an exploded, fragmentary, perspective view illustrating a portion of the bottom of the storage module, a tray for connection thereto, and an insert member for receipt into the tray.

FIG. 8 is a perspective view of the second modified form of tray insert.

FIG. 9 is a perspective view of the second form of tray insert member shown in FIG. 4 and detached from the tray.

Figure 1:
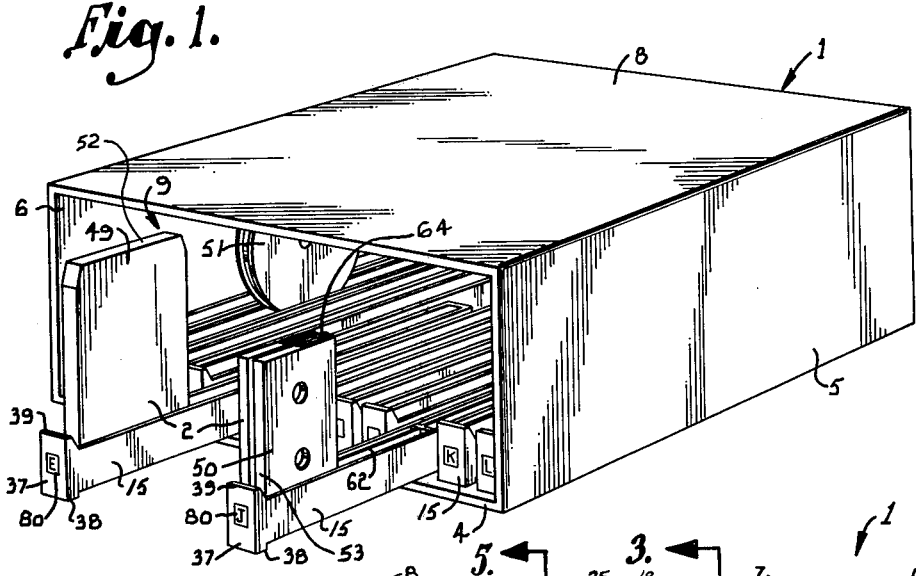
FIG. 1 is a perspective view showing a storage module embodying this invention and having a plurality of slidable trays therein.

FIG. 1 depicts a storage module, generally designated by the reference numeral 1, embodying the present invention and retaining a plurality of individual containers 2, such as, but not limited to, those typically used for recording tapes, film, and the like. The storage module 1, in this example, is a box-like receptacle a plurality of which may be stacked in a column, and in the illustrated example has a planar bottom wall 4, spaced parallel side walls 5 and 6, an end wall 7, and a top or cover wall 8. A front 9 is illustrated open for access to the interior of the storage module 1, and through which trays, described below, may be received, although it is within the contemplation of the invention that a protective door or decorative cover (not shown) can be utilized. It is also within the contemplation of this invention that a multi-level storage module can be formed by employing a plurality of bottom walls 4 stacked in a vertical series, in which case, the lowermost bottom wall 4 would be the module bottom wall.

The storage module 1 and interior parts thereof as described below, are preferably constructed of a readily formed synthetic plastic resin such as polystyrene, polypropylene, or ABS, including such products as Plexiglas and the like. Therefore, it is desired that the completed product be relatively light in weight, resistant to breakage, and free from maintenance.

The storage module 1 includes coordinating mounting means for slidably and removably mounting trays 15 therein. In the illustrated example, FIG. 2, such means includes a straight, longitudinally elongated groove or slot 12 having sidewalls 14 and formed in the bottom wall 4 from adjacent the front 9 and terminating adjacent the rear end wall 7 and intersecting the elongated slot 12. The slot 12 thus includes unseparated portions 18 and 19 adjacent the respective end wall 7 and front 9 for providing structural integrity of the bottom wall 4.

In the illustrated example, the bottom wall 4 is constructed like a hollow sandwich for forming the slot 12 therein and comprises a lower deck 21 which forms a solid bottom layer and a plurality of spacing strips 23 which extend vertically therefrom and support an upper deck 25. The slot 12 is formed in the upper deck 25 and has a transversely extended slot or opening 27 positioned toward the end wall 7 to provide access for engagement with the slot 12.

In the illustrated example, each tray 15 comprises an open, channel-shaped, elongated receptacle adapted for receipt in the storage module 1 adjacent the bottom wall 4 and having a planar bottom 30 and spaced, parallel side walls 32 and 33 extended normally thereto. A rear end wall 35 and a front end wall 37 close the opposite ends of the tray 15, thereby forming a structure in the shape of an elongated rectangle having an open top 40 for access thereto. To position the tray 15 within the storage module 1, the deck 25 is recessed inwardly from the open front to a face 41, FIG. 7. The front end wall 37 includes a projecting bottom stop 38 which abuts the face 41 when slid thereagainst and prevents further inward movement of the tray 15. To provide a handle for grasping and drawing the tray 15 to the exterior of the storage module 1, the front end wall 37 has a lip 39 projecting upwardly therefrom.

As referred to above, an engagement means connects the tray 15 to the bottom wall 4 for slidably and removably mounting the tray 15 in the storage module 1. In the illustrated example, the engagement means comprises a downwardly projecting Tee-shaped protuberance or connector 45 which is slidably received into the slot 12. The connector 45 has a narrow shaft 46 to fit between the sidewalls 14 and a relatively wider head 47 to engage the underside of the upper deck 25 and thereby retain the tray 15 connected to the sidewalls 14 of the slot 12. The head 47 has a slightly lesser marginal dimension than that of the opening 27, thereby permitting insertion of the connector 45 into the slot 12 when vertically aligned with the opening 27. Once the connector 45 is thusly positioned, forward or rearward sliding of the tray 15 moves the connector 45 from alignment with the opening 27 and slidably engages the tray 15 with the bottom wall 4, thereby permitting selective removal and engagement of the tray 15 within the interior of the storage module 1. In the illustrated example, FIG. 2, vanes 43 are spaced adjacent opposite walls 32 and 33 and extended from the bottom wall 4 at the front 9 thereof to guide the sliding movement of the tray 15.

When the tray 15 is engaged within the storage module 1, access to the containers 2, FIG. 1, is achieved by grasping the lip 39 and using the same as a handle to slide the tray through the open front 9. In most instances, there is no need for disengagement of the tray 15 from the bottom wall 4, as described above, however, if it is desired that the tray 15 be utilized as described below, then it may be preferable to remove the tray 15 for ease in working therewith.

Differently structured inserts can be snugly received into the trays 15 for retaining various forms of respective containers 2, such as recording tape cartridges 49, cassettes 50, and reels 51. The respective containers 2 have substantially different industry standard dimensions; for example, a standard cartridge 49 measures approximately 4 by 5¼ by ⅞ inches and a cassette 50 is approximately 2½ by 3¾ by ⅝ inches. Although the tray 15 can be produced having various dimensions, those which approximate a whole number multiple of the dimensions of a selected container 2 are most suitable for efficient utilization of space. For example, the illustrated tray 15 is 13/16 inches wide and 12 inches long and will accomodate three cartridges 49 placed on an end and side-by-side. Alternatively, the tray 15, having dimensions as set forth above, can be used to accomodate eight cassettes 50 similarly positioned.

In the illustrated example, FIGS. 3 and 7, a first insert structure 54 is shaped for use by either cartridges 49 or cassettes 50. The insert structure 54 includes a planar base 56 having marginal dimensions corresponding to the inside longitudinal and lateral dimensions of the tray 15 for snugly fitting therein. A plurality of partition forming members, in the illustrated example, are comprised of vane-like first protuberances 57 which extend outwardly from the base plate 56 and are spaced along the longitudinal centerline. The protuberances 57 are spaced thereon at selected intervals corresponding to the short or end dimension 52 of a cartridge 59. As the end dimension 52 of a standard cartridge 49 is approximately the same as the long dimension 53 of a cassette 50, the first insert structure 54 is also adapted to snugly receive a cassette 50 by means of other partition forming members comprised of a set of block-like second protuberances 59 positioned laterally adjoining the first protuberances 57. The spaced second protuberances 59 mutually correspond to the long dimension 53 of a cassette 50 and provide a series of pad or blocks which press against the cassette 50 and inhibit movement and rattling thereof. To provide further engagement means, upwardly extended channels 60 are formed in the second protuberances 59 and provide portions for mutual engagement with ridge portions 64 formed in the cassettes 50. Thusly modified with the first insert 54, the respective tray 15 can selectively accomodate either a series of cartridges 49 stacked on the respective ends 52 or a double row of cassettes 50 laid on their long sides 53, or various combinations of the above.

A second insert structure 62 is illustrated in FIGS. 4 and 9 and is also comprised of a set or series of partitions which snugly fit into a tray 15 and are shaped and spaced for receiving a plurality of cassettes 50 stacked on an end 55 and side-by-side. The partitions include a central divider 61 extended along the longitudinal centerline of the tray 15 and a plurality of cross plates 63 extended normally across the divider 61 at selected intervals corresponding to the end dimension 55 of a cassette 50. The second insert structure 62 thusly forms a framework which can be inserted "as is" into the tray 15 or which, as in the illustrated example, can be mounted on a spacer assembly 65. The spacer assembly 65 elevates the insert structure 62 from the basal plate 30 of the tray 15 and tends to stabilize the same against excessive wobbling movement. The spacer assembly 65 forms an inverted, downwardly open, rectangular structure and includes a planar bottom 67 with opposing side walls 69 and opposing end walls 71 positioned normally thereon.

Figure 2:
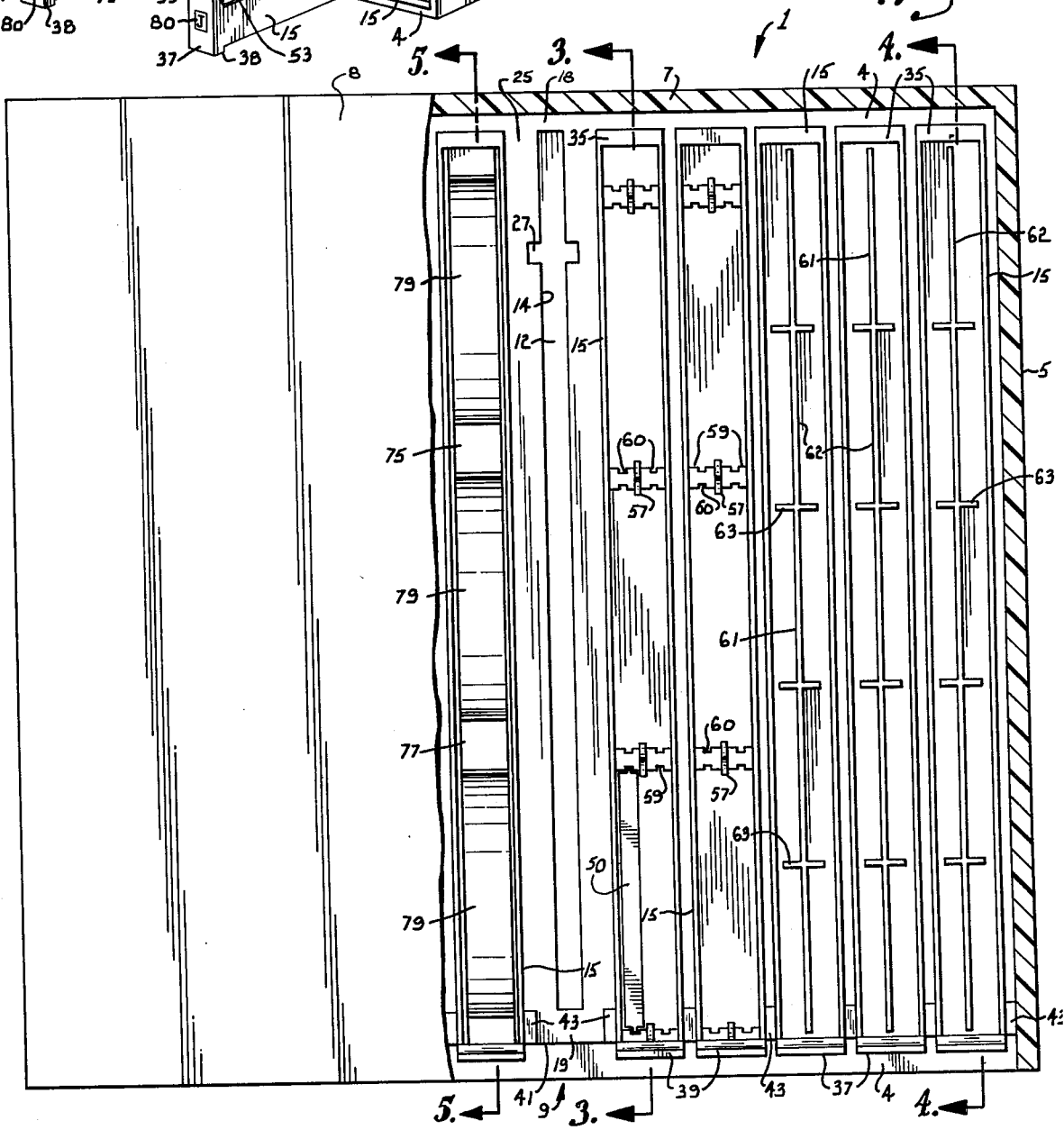
FIG. 2 is a plan view of the module with a portion broken away showing a plurality of differently structured insert members.

The tray 15 can also be adapted to retain reels 51, such as shown for example in FIG. 2, by inserting a third insert structure 75 therein. The insert structure 75 includes a planar base 77 which is similar to the planar base 56 described in connection with FIG. 7 and has a plurality of arcuate and upwardly curved segments 79 mounted thereon. The segments 79 preferably correspond in degree of curvature to an arcual segment of the reel 51 and thereby cradle the reel and inhibit rolling or other movement of the reel 51 in the tray 15. It is within the contemplation of this invention that the base 77 may form part of a spacer assembly 65 as described in connection with FIG. 9 if elevating the insert structure 75 within the tray 15 is desired.

Containers 2 having different respective dimensions may thus be easily received in the module 1 and retained against excessive movement and rattling by the various forms of partitions shown as examples herein. Moreover, the containers 2 can be filed according to topic, program, or the like and identified by a symbol or tag 80, FIG. 1.

Alternative forms and structures within the concept of the invention disclosed herein are many and varied and it is to be understood that while one form of this invention has been illustrated and described, it is not to be limited to the specific form or arrangement of parts herein described and shown, except insofar as such limitations are included in the following claims.

What is claimed and desired to secure by Letters Patent is:

1. A storage module for receiving articles of various external dimensions comprising:
   (a) a receptacle having a horizontally extending bottom wall;
   (b) a plurality of elongated, parallel, channel-like trays adapted for receipt into said receptacle adjacent said bottom wall;

(c) engagement means respectively associated between said trays and said bottom wall and slidably retaining said trays upon said bottom wall, said trays being selectively movable along said bottom wall to the exterior of said receptacle; and (d) a plurality of partition-forming insert members snugly engaged within a plurality of said trays and having upright portions extending generally transversely and dividing the respective trays into separate compartments spaced along longitudinal axes of respective said trays, said compartments having dimensions commensurate with an external dimension of said respective articles for snugly receiving said articles therein without excessive rattling and wobbling.

2. The storage module as set forth in claim 1 wherein:

(a) a plurality of said trays each have lateral and longitudinal internal dimensions generally equal to a whole number multiple of an exterior dimension of a selected article of said articles.

3. The storage module as set forth in claim 2 wherein:

(a) said insert members are detachably engaged in said trays.

4. A storage module for receiving articles of various external dimensions comprising:

(a) a receptacle having a horizontally extending bottom wall;

(b) a plurality of elongated, parallel, channel-like trays adapted for receipt into said receptacle adjacent said bottom wall;

(c) engagement means respectively associated between said trays and said bottom wall and slidably retaining said trays upon said bottom wall, said trays being selectively movable along said bottom wall to the exterior of said receptacle; and (d) a plurality of partition-forming insert members snugly engaged within a plurality of said trays and dividing the respective trays longitudinally into separate compartments having dimensions commensurate with an external dimension of said respective articles for snugly receiving said articles therein without excessive rattling and wobbling;

(e) said insert members including a first set of insert members having compartments of internal dimensions commensurate with articles having a first external dimension; and (f) a second set of insert members having compartments of internal dimensions commensurate with articles having a second external dimension different from said first dimension.

5. The storage module as set forth in claim 4 wherein:

(a) said first insert members are interchangeable in said trays with said second insert members.

6. A storage module for receiving articles of various external dimensions comprising:

(a) a receptacle having a horizontally extending bottom wall;

(b) a plurality of elongated, parallel, channel-like trays adapted for receipt into said receptacle adjacent said bottom wall;

(c) engagement means respectively associated between said trays and said bottom wall and slidably retaining said trays upon said bottom wall, said trays being selectively movable along said bottom wall to the exterior of said receptacle; and (d) a plurality of partition-forming insert members snugly engaged within a plurality of said trays and dividing the respective trays longitudinally into separate compartments having dimensions commensurate with an external dimension of said respective articles for snugly receiving said articles therein without excessive rattling and wobbling;

(e) said insert members including partitioning means selectively dividing said trays into compartments having internal dimensions commensurate with either an article having a first external dimension or an article having a second external dimension different from said first dimension.

7. A storage module for receiving articles of various external dimensions comprising:

(a) a receptacle having a horizontally extending bottom wall;

(b) a plurality of elongated, parallel, channel-like trays adapted for receipt into said receptacle adjacent said bottom wall;

(c) engagement means respectively associated between said trays and said bottom wall and slidably retaining said trays upon said bottom wall, said trays being selectively movable along said bottom wall to the exterior of said receptacle; and (d) a plurality of partition-forming insert members snugly engaged within a plurality of said trays and dividing the respective trays longitudinally into separate compartments having dimensions commensurate with an external dimension of said respective articles for snugly receiving said articles therein without excessive rattling and wobbling;

(e) said engagement means including a plurality of parallel, elongated slots extended along said bottom wall and a plurality of retaining protuberances projecting downwardly from said trays and received into respective said slots.

8. The storage module as set forth in claim 7 wherein:

(a) said engagement means includes transverse slots intersecting said elongated slots, said transverse slots being wider than said protuberances for detachable retention of said trays with said bottom wall.

* * * * *